(12) United States Patent
Hartmann et al.

(10) Patent No.: US 7,384,071 B2
(45) Date of Patent: Jun. 10, 2008

(54) FENDER ASSEMBLY AND MOUNTING CLAMP THEREFOR

(75) Inventors: Andrew Hartmann, Muskegon, MI (US); Wesley K. Eklund, Muskegon, MI (US)

(73) Assignee: Fleet Engineers Incorporated, Muskegon, MI (US)

( * ) Notice: Subject to any disclaimer, the term of this patent is extended or adjusted under 35 U.S.C. 154(b) by 268 days.

(21) Appl. No.: 10/906,215

(22) Filed: Feb. 9, 2005

(65) Prior Publication Data

US 2005/0179245 A1 Aug. 18, 2005

Related U.S. Application Data

(60) Provisional application No. 60/521,065, filed on Feb. 13, 2004.

(51) Int. Cl.
B62D 25/18 (2006.01)
(52) U.S. Cl. .................. 280/854; 280/154
(58) Field of Classification Search ............ 280/847, 280/848, 154, 851, 156, 854, 159, 152.3, 280/152.05
See application file for complete search history.

(56) References Cited

U.S. PATENT DOCUMENTS

| 817,203 A | 4/1906 | Thompson |
| 1,094,134 A | 4/1914 | Dickerson |
| 1,158,947 A * | 11/1915 | McGregor ............... 293/140 |
| 1,434,477 A | 11/1922 | Bury |
| 1,489,062 A | 4/1924 | Burnam |
| 1,519,860 A | 12/1924 | McClelland |
| 1,537,852 A * | 5/1925 | Mandry ................. 280/854 |
| 1,550,247 A | 8/1925 | Firquain |
| 1,551,813 A | 9/1925 | Dunn |
| 1,593,063 A | 7/1926 | Dunn |
| 1,667,209 A | 4/1928 | Langdon |
| 2,068,732 A * | 1/1937 | Cadwallader ............ 280/848 |
| 4,377,294 A | 3/1983 | Lockwood et al. |
| 4,591,178 A | 5/1986 | Mortvedt et al. |
| 4,712,805 A * | 12/1987 | McMillen ............... 280/851 |
| 5,165,712 A * | 11/1992 | Fuller ..................... 280/277 |
| 5,950,975 A | 9/1999 | Zieske |
| 6,029,999 A * | 2/2000 | O'Day .................... 280/851 |
| 6,186,527 B1 * | 2/2001 | Monhollen et al. ....... 280/154 |
| 6,199,883 B1 * | 3/2001 | Gable .................... 280/152.1 |
| 6,354,625 B1 | 3/2002 | Lambertus |
| 6,592,147 B2 | 7/2003 | Lambertus |
| 6,634,664 B1 * | 10/2003 | Kojima .................. 280/288.4 |

(Continued)

FOREIGN PATENT DOCUMENTS

DE  8609090 U1  7/1987

(Continued)

*Primary Examiner*—Christopher P. Ellis
*Assistant Examiner*—Bridget Avery
(74) *Attorney, Agent, or Firm*—McGarry Bair PC

(57) ABSTRACT

A fender assembly for a heavy-duty vehicle comprises a fender and clamping members having reciprocal mating elements for adjustably and removably coupling the clamping members and the fender. The clamping members are clamped to inner and outer edges of the fender and are adapted to receive and removably secure a mounting arm that extends from the vehicle. The position of the fender relative to the vehicle can be adjusted by repositioning the clamping members along the inner and outer edges.

39 Claims, 6 Drawing Sheets

U.S. PATENT DOCUMENTS

| | | | | |
|---|---|---|---|---|
| 6,648,373 B2 * | 11/2003 | Hawes | ........................ | 280/854 |
| 6,893,048 B2 * | 5/2005 | Rush et al. | .................. | 280/854 |
| 7,073,804 B2 * | 7/2006 | Hawes | ........................ | 280/154 |
| 2004/0004351 A1 * | 1/2004 | Hawes | ........................ | 280/851 |

FOREIGN PATENT DOCUMENTS

| | | |
|---|---|---|
| DE | 9409662 U1 | 8/1994 |
| EP | 1172283 A | 2/2002 |
| FR | 2690125 A | 10/1993 |

\* cited by examiner

FENDER ASSEMBLY AND MOUNTING CLAMP THEREFOR

CROSS REFERENCE TO RELATED APPLICATIONS

This application claims the benefit of U.S. Provisional Application Ser. No. 60/521,065, filed Feb. 13, 2004, which is incorporated herein by reference in its entirety.

DESCRIPTION OF THE RELATED ART

Heavy-duty vehicles, such as a tractor-trailer, use fender assemblies to cover the otherwise exposed drive wheels of the tractor. As illustrated in FIG. 1, many prior art fender assemblies A comprise a mounting arm B that extends laterally from the vehicle frame C, mounting brackets D, and a fender E. The mounting brackets D are fixed to the fender E and receive the mounting arm B. The mounting arm B bears a preponderance of the weight of the fender E and maintains the fender E in a desirable position above the drive wheels F. At one end, the mounting arm B can be fixed or rotatably mounted to the vehicle frame C. When the mounting arm B is rotatably mounted, the fender assembly A is rotationally adjustable relative to the vehicle frame C. The other end of the mounting arm B is secured to the fender E by the mounting brackets D.

In the exemplary prior art fender assembly A in FIG. 1, the mounting brackets D are secured to the fender E by traditional mechanical fasteners, which are shown as bolts G, that extend through the fender E. These and other conventional mechanical means typically require permanent alteration of the fender. For example, to mount the fender assembly to the vehicle frame, the mounting arm, the mounting brackets, and the fender are aligned relative to each other and to the vehicle frame, holes are drilled through the fender in locations to accomplish the desired alignment, and then the bolts or other mechanical fasteners are inserted through the mounting brackets and the holes in the fender. Because this process is very labor intensive and the working area near the vehicle frame is usually limited, it is often difficult to accurately mount the fender in the desired position. Typically, the fender is placed in proper location with respect to the wheels. This location is critical and cannot be altered. Then, the mounting arm B is mounted to the frame and the position of the mounting brackets on the fender is observed and the hole locations are marked. Often, there is very limited maneuvering room for the mounting arm and there is not much room to adjust the position of the mounting arm B with respect to the fender. If the holes are drilled in incorrect locations, the fender can be improperly positioned or the mounting brackets D might not align with the holes. Frequently, the fender must be marked again and new holes drilled in the fender. Other means of fixing the mounting brackets to the fender include welding, soldering, or other chemical bonding means. While chemical bonding methods securely fix the mounting brackets to the fender, they permanently alter the fender and have deficiencies similar to those of mechanical fastening means, especially if the brackets are improperly mounted.

Examples of prior art mounting brackets are disclosed in several patents. U.S Pat. No. 5,950,975 to Zieske (Zieske '975) discloses a fender mounting assembly comprising a fender mounting plate having traditional circular clamps for receiving a mounting arm. The clamps include bolts that can be tightened to securely grasp the arm, and the fender mounting plate is coupled to a lower surface of a fender. Alternatively, the arm can be directly attached to the fender by bolts and nuts. Another fender assembly is disclosed in U.S. Pat. No. 4,591,178 to Mortvedt et al. (Mortvedt '178). In Mortvedt '178, U-shaped clamps sized to receive mounting tubes are secured to an upper surface of the fender with bolts that extend through the clamps and holes in the fender. U.S. Pat. No. 4,377,294 to Lockwood et al. (Lockwood '294) discloses a fender assembly comprising a mounting arm that sits within a support seat formed in an upper surface of the fender panel. Clamping plates are positioned inside the mounting arm and against the bottom surface of the fender panel. Threaded bolts extend through the clamping plates, the mounting arm, and the fender panel to securely couple the mounting arm to the fender panel. Additionally, U.S. Pat. No. 1,094,134 to Dickerson (Dickerson '134) discloses a fender assembly with a bent tubular arm having an inner horizontal portion and an outer horizontal portion that is received by brackets, which are positioned under the fender and fastened thereto with bolts.

Fender bracing assemblies were commonly used on early passenger automobiles to hold fenders under tension and to lift fenders to their proper positions. Such assemblies commonly comprised a rod or wire that connects clamps or brackets coupled to fenders on both sides of the automobile. The clamps typically wrap around the edges of the fenders and include means for retaining the rod or wire. For example, U.S. Pat. No. 1,489,062 to Burnam (Burnam '062) discloses a fender brace comprising a flexible wire cable disposed between two front fenders. A pair of bifurcated hook clamps, each having a hook portion and an eye portion, is mounted to each fender such that the hook portions wrap around the edges of the fenders. The wire cable is threaded through the eyes and secured in place with nuts and bolts. Similar braces are described in U.S. Pat. No. 1,434,477 to Bury (Bury '477) and U.S. Pat. No. 1,511,813 to Dunn (Dunn '813). The clamps in the Bury '477 and the Dunn '813 devices are single-piece components that wrap around both the inside and outside edges of the fenders. Fender bracing assemblies differ from fender mounting assemblies in that the latter bear a preponderance of the fender weight while the former merely hold a pair of fenders under tension to prevent vibration and to assist in holding them above the automobile wheels.

SUMMARY OF THE INVENTION

According to the invention, a fender assembly comprises a vehicle fender, a mounting arm adapted to be attached to a vehicle frame at one end and to support the vehicle fender at the other end; and a pair of mounting clamps adapted to adjustably mount to the fender without physically altering the fender and to mount to the mounting arm, to thereby mount the fender for selective adjustment with respect to a vehicle frame when the one end of the mounting arm is mounted to a vehicle frame. The fender is preferably clamped between the mounting clamps at opposite edges of the fender.

In one embodiment, the fender has side edges and the mounting clamps have grooves that receive a portion of the side edges of the fender. Preferably, the fender and the mounting clamps include complementary mating elements that lock the clamps and fender in an adjusted relationship. In one embodiment, the complementary mating elements are in the form of serrations on the fender side edges and on the groove in the mounting clamps. Further, the serrations can comprise channels and fingers and can have complementary sloped ridges between the channels and fingers on the fender side edges and the groove in the mounting clamps. The portions of the fender side edges that are received in the groove can form undercut pockets that receive a portion of the clamping members.

In a preferred embodiment of the invention, the fender is integrally molded of a synthetic plastic resin, preferably, a high density polypropylene. Also, the clamping members can be integrally molded of a synthetic plastic resin, preferably a fiberglass filled nylon.

Typically, a bore is formed in the clamping members for receiving the mounting arm. A threaded aperture is provided in the clamping members transverse to and intersecting the bore, and a set screw in threaded apertures for releasably retaining the relative positions of the clamping members on the mounting arms. In preferred embodiment, the threaded bore is formed in a metal T nut mounted in a through hole in the clamping members. The T nut has a lateral flange that is received in the bore.

Further, according to the invention, a clamping members for use in adjustably mounting a fender to a vehicle has an attachment part for releasably attaching the clamp to a mounting arm that is adapted to be attached to a vehicle and the clamping member has a groove that is adapted to receive a portion of side edges of the fender. Two such clamps can be positioned on opposing sides of a fender to releasably mount the fender to a mounting arm. Preferably, the groove has a plurality of serrations for gripping the side edges of a fender. In addition, the serrations can be formed with channels and fingers. In addition, complementary sloped ridges can be formed between the channels and fingers on the groove. Preferably, the clamping members are integrally molded of a synthetic plastic resin, preferably a fiberglass filled nylon.

Still further according to the invention, a vehicle fender that is adapted to adjustably mount to a vehicle without alteration of the fender comprises side edges having serrations on inner and outer edges thereof that are adapted to mate with clamps that have complementary serrations and are supported by a support arm that is adapted to be mounted to a vehicle. The serrations can comprise channels and fingers and further can include complementary sloped ridges between the channels and fingers. In a preferred embodiment of the invention, the fender is integrally molded of a synthetic plastic resin, preferably a high density polypropylene. Further, portions of the fender side edges can be formed with undercut pockets that are adapted to receive a portion of clamping members.

DESCRIPTION OF THE PREFERRED EMBODIMENT

Figure 2:
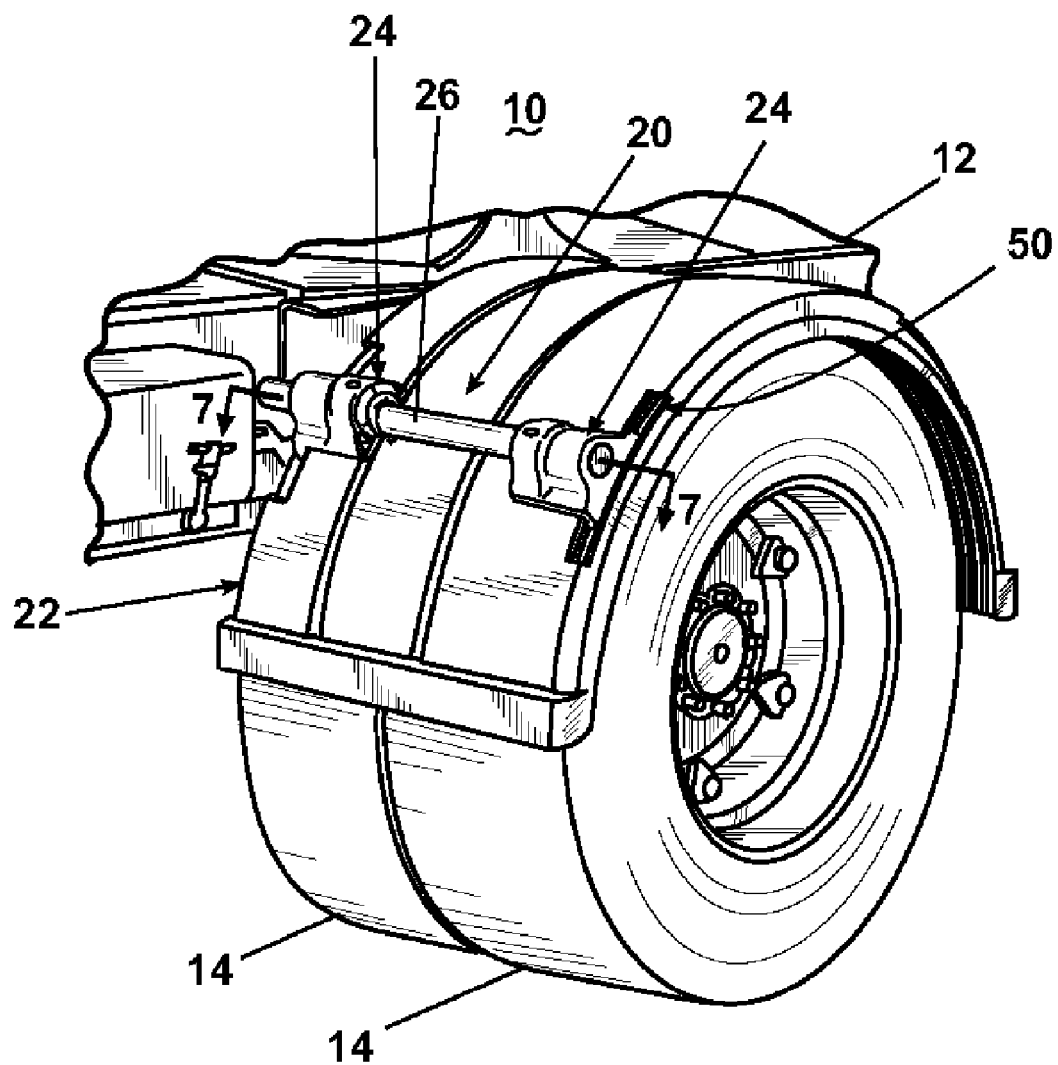
FIG. 2 is a perspective view of a fender assembly according to the invention comprising a fender and a pair of removable clamping members that receive a mounting arm.
Figure 3:
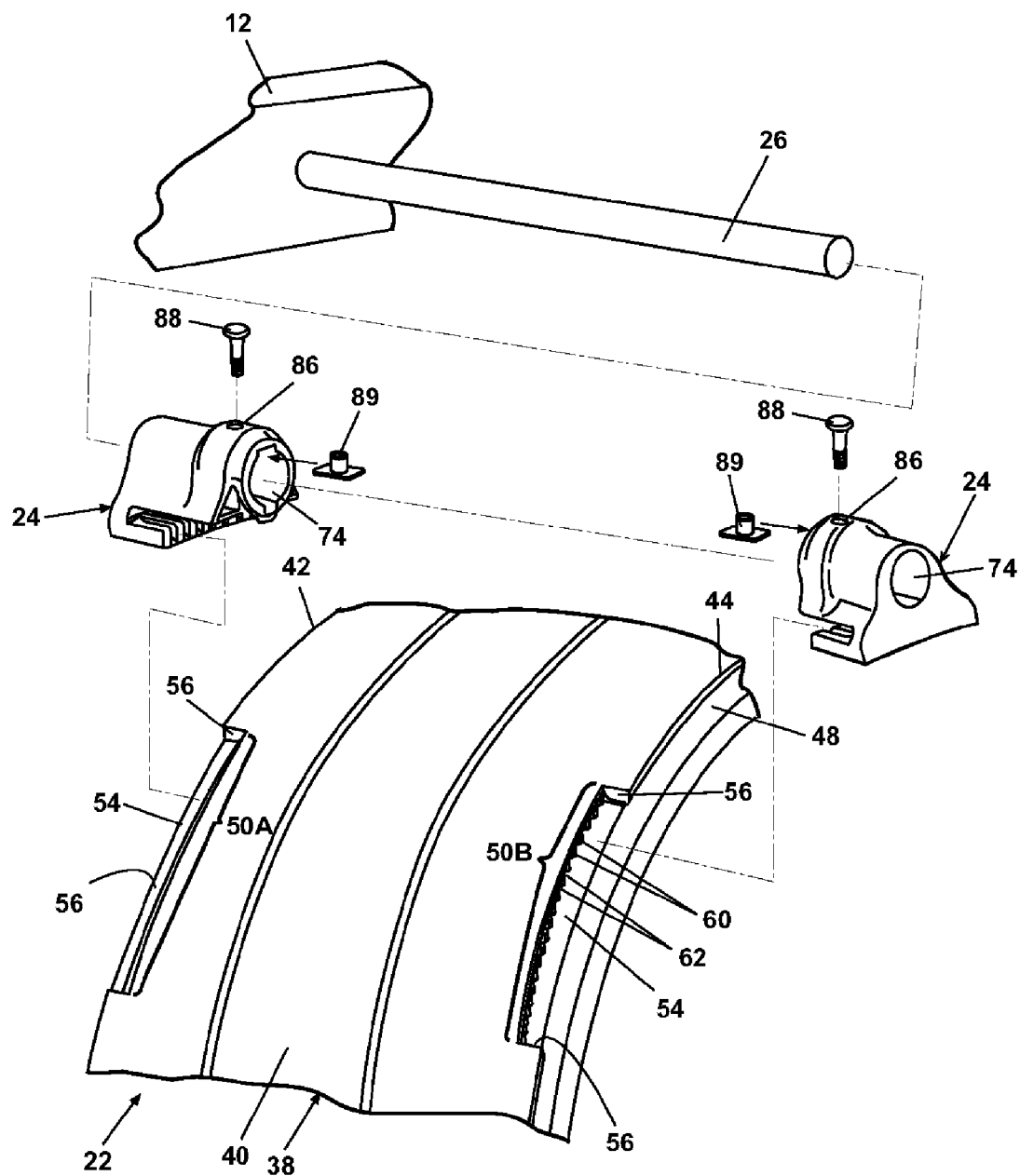
FIG. 3 is an exploded view of the fender assembly in FIG. 2.

Referring now to the figures, and particularly to FIGS. 2 and 3, a portion of a heavy-duty vehicle in the form of a tractor-trailer 10 has a frame 12 to which ground-engaging wheels 14 are rotatably mounted. A fender assembly 20 according to the invention comprises a fender 22, a pair of clamping members 24, and a mounting arm 26 that mounts the fender 22 to the vehicle frame 12. While the mounting arm 26 is illustrated as a straight rod, the mounting arm can have any suitable form, including a rotationally adjustable mounting arm. Mounting arms are well known and not germane to the invention; therefore, the mounting arm 26 will not be discussed in further detail.

Figure 7:
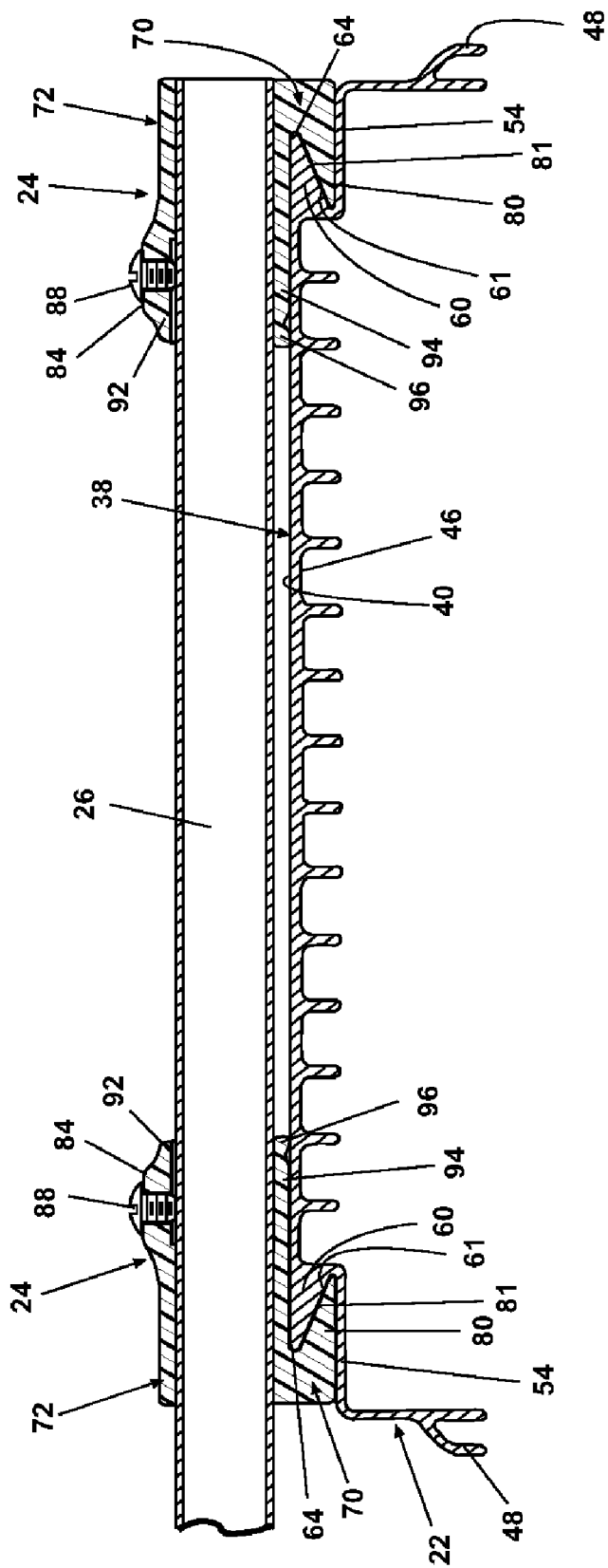
FIG. 7 is a sectional view of the fender assembly taken along line 7-7 of FIG. 2.

Referring now to FIGS. 2-4A and 7, the fender 22 has a width slightly greater than that of the wheels 14 and is curved to overlie the wheels 14. The fender 22 is illustrated as a full single axis fender that extends through a 180-degree arc; however, it is within the scope of the invention for the fender 22 to be of any type or size. For example, the fender 22 can be single-axis or tandem; full (180-degree), half (90-degree), or quarter (45-degree); and single or double-radius. The fender 22 comprises a panel 38 defined by parallel inner and outer edges 42, 44 and having a relatively flat upper surface 40 and a ribbed lower surface 46. Extending radially inwardly from the inner and outer edges 42, 44 are side walls 48, which are bifurcated at a lower portion thereof, as best seen in FIG. 7. The inner and outer edges 42, 44 include mount sections 50 adapted to mate with the clamping members 24. Preferably, the mount sections 50 are arranged in a pair, wherein a first mounting section 50A is disposed along the inner edge 42 and a second mounting section 50B is located along the outer edge 44 directly across from the first mounting section 50A.

Each mount section 50 has an undercut pocket 66 defined by the panel 38 that terminates in a lateral side edge 64, a lower wall 54 radially spaced from the panel 38 and integral with the fender side walls 48, and flanking walls 56. As best viewed in FIG. 4A, a plurality of sloped ridges 60 with channels 62 therebetween extend down from the lateral side edge 64 and towards the lower wall 54. Each sloped ridge 60 has a sloped face 61, as illustrated in FIG. 7. The length, or distance between the flanking walls 56, of each mount section 50 is preferably greater than the width of the clamping members 24. Consequently, the position of the clamping members 24 is adjustable within mount sections 50.

Figure 4:
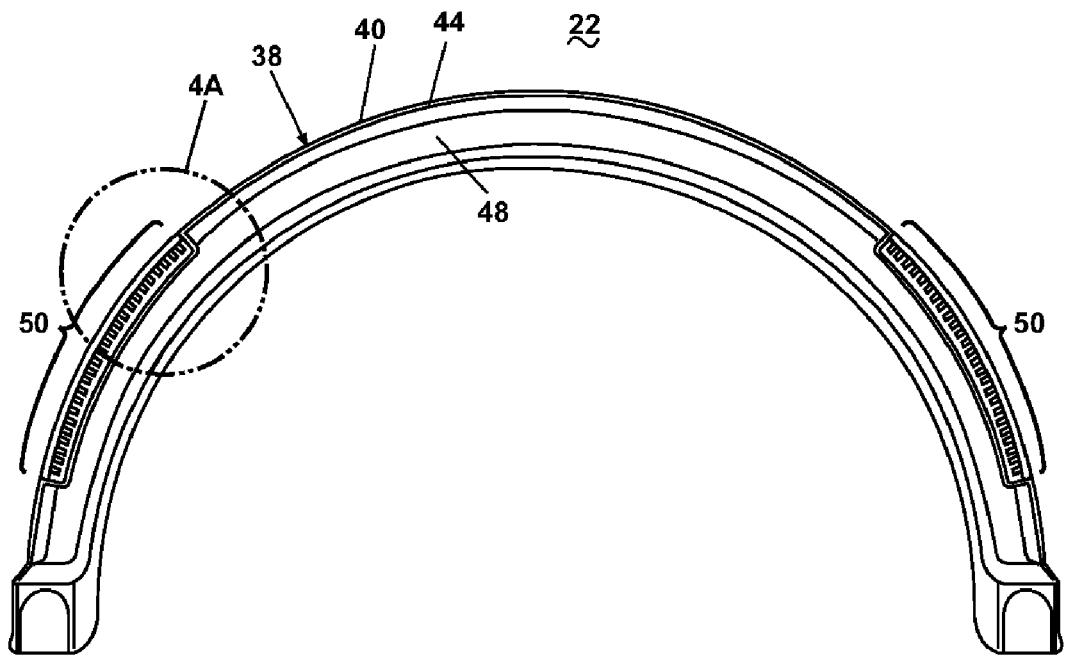
FIG. 4 is a side view of the fender in FIG. 2.
Figure 4A:
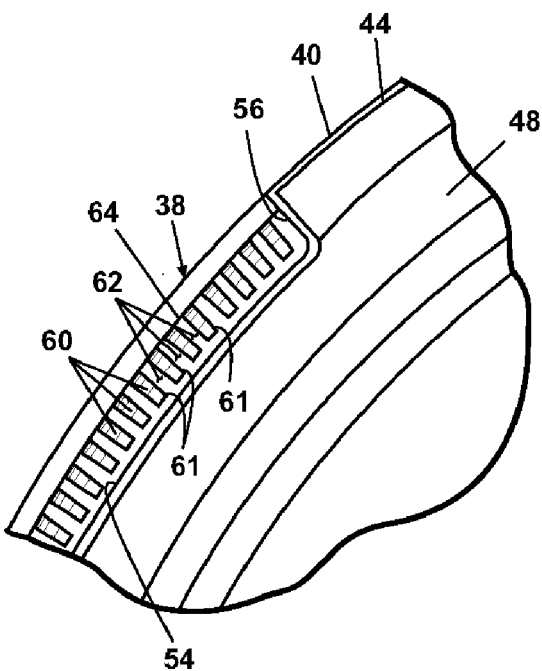
FIG. 4A is a close up view of the region labeled 4A in FIG. 4.

As shown in FIG. 4, the fender 22 can optionally comprise two circumferentially spaced pairs of mount sections 50. It should be apparent to one skilled in the art that the fender 22 can comprise any number of mount sections 50 located anywhere on the fender 22 for mounting the fender 22 to the vehicle 10. Each pair of mount sections 50 corresponds to its own pair of clamping members 24 and its own corresponding mounting arm 26. The number of mount sections 50 depends on factors such as the shape, size, and weight of the fender 22. For brevity, the description of the fender assembly 10 presented herein is limited to a single pair of mount sections 50.

The fender can be made from a number of light weight, rigid materials, such as steel, aluminum and synthetic resin. In a preferred embodiment, the fenders are injection molded of a synthetic thermoplastic resin. The type of resin can vary, depending the desired properties. In a preferred embodiment, the fenders are injection molded from a high density polypropylene.

Referring now to FIGS. 3 and 5-7, each clamping member 24 comprises a base 70 with a curvature substantially equal to that of the fender panel 38 and a body 72 having a bore 74 therethrough sized to receive the mounting arm 26. The bore 72 has an indentation 82 at an upper portion of the outer end thereof. The base 70 and the body 72 are partially separated by a groove 76 sized to receive the inner or outer edge 42 or 44 of the fender panel 38.

The base 70 comprises a plurality of fingers 78 disposed between sloped ridges 80 having sloped faces 81. The fingers 78 are sized for receipt within the fender channels 62, and the sloped ridges 80 are designed to mate with and complement the sloped ridges 60 on the fender 22 such that their respective sloped faces 81, 61 abut each other, as best viewed in FIG. 7. Additionally, the areas between the fingers 78 and above the sloped ridges 80 have a slight inward taper to facilitate an interference fit when the sloped ridges 60 are inserted therein.

Figure 5:
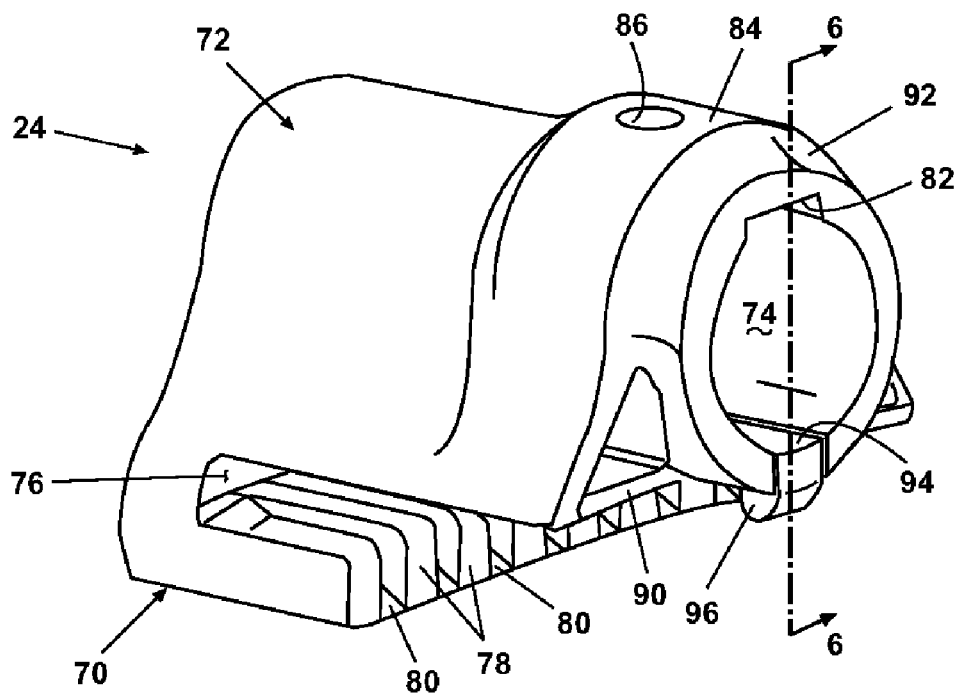
FIG. 5 is an enlarged perspective view of the removable clamping member in FIG. 2.
Figure 6:
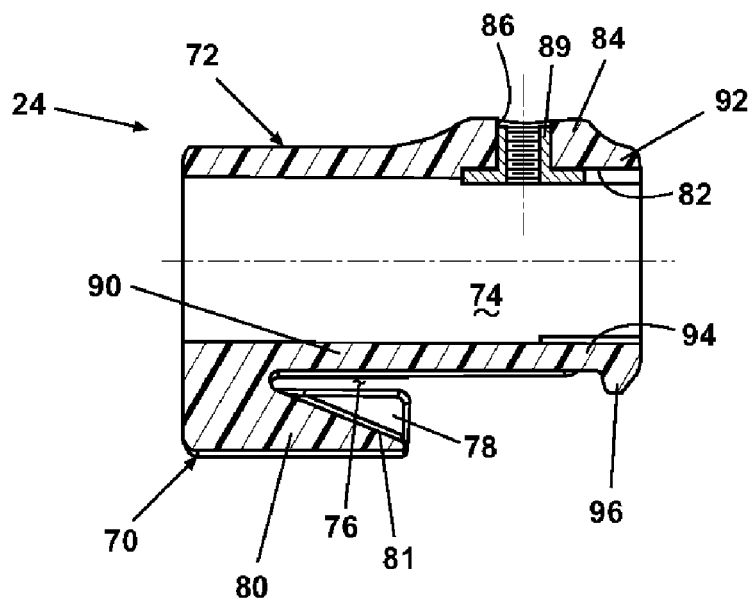
FIG. 6 is a sectional view of the removable clamping member taken along line 6-6 of FIG. 5.

Referring particularly to FIGS. 5 and 6, the body 72 protrudes forward of the base 70 and merges from a substantially planar wall 90, which partially defines the groove 76, into a generally cylindrical portion 92, which defines the bore 74. The cylindrical portion 92 comprises a collar 84 having a radial opening 86 for receiving a setscrew 88. An internally threaded T-nut is positioned in the indentation 82 and extends into the opening. The setscrew is threaded into the T-nut and extends out the bottom thereof for gripping contact with mounting arm 26. The cylindrical portion 92 further comprises, along a lower portion thereof, a lever 94 that is substantially parallel to the longitudinal axis of the bore 74. The lever 94 can pivot relative to the body 72 and includes a downwardly extending orthogonal tab 96.

The clamping members 24 can be formed of a number of different materials, including metal casting or synthetic resins. In a preferred embodiment of the invention, the clamping members are injection molded from a hard strong thermoplastic, such as Nylon. An exemplary material for the molded clamping members is a 15% fiberglass filled 6,6 nylon with a stainless steel T nut 89.

An exemplary description of the assembly of the fender assembly 20 follows. It will be apparent to one of ordinary skill in the fender art that the steps in the procedure of mounting the fender 22 to the vehicle 10 can transpire in any logical order and are not limited to the sequence presented below. The following description is for illustrative purposes only and is not intended to limit the invention in any manner.

The mounting arm 26 is attached to the vehicle 10 in a conventional manner. For example, the mounting arm 26 can be mechanically secured to a desired location on the vehicle frame 12 by fasteners, such as bolts. Next, the clamping members 24 are coupled to the fender 22 in a desired location within the length of the mount sections 50. A first clamping member 24 is inserted into the mount section 50A on the fender inner edge 42, and a second clamping member 24 is similarly joined with the mount section 50B on the fender outer edge 44. Preferably, the clamping members 24 are positioned directly across from each other such that their bores 74 are axially aligned. To insert the clamping member 24 into the mount section 50, the clamping member fingers 78 are aligned with the fender channels 62, the clamping member sloped ridges 80 are aligned with the fender sloped ridges 60, and the clamping member groove 76 is aligned with the fender panel 38. Once the clamping member 24 is aligned with the mount section 50, the former is slid into the latter such that the fender channels 62 receive the clamping member fingers 78, the sloped faces 61, 81 of the fender and clamping member sloped ridges 60, 80 abut in complementary fashion, and the clamping member groove 76 receives the lateral side surface 64 of the fender panel 38. As the clamping member 24 is inserted into the mount section 50, the fender panel upper surface 40 exerts an upward force on the tab 96 of the lever 94, and, consequently, the lever 94 pivots into the bore 74. Movement of the lever 94 helps secure the fender assembly 10 together, as will be discussed in more detail hereinafter.

After the mounting arm 26 is attached to the vehicle frame 12 and the clamping members 24 are coupled with the fender 22, the fender 22 and clamping members 24 are mounted to the mounting arm 26. Logically, the clamping member 24 on the fender inner edge 42 is slid onto the mounting arm 26 first and is followed by the clamping member 24 on the fender outer edge 44 such that the axially aligned bores 74 receive the mounting arm 26. As illustrated in FIG. 7, the setscrews 88 are inserted into the openings 86, threaded into the T-nuts 89 and tightened to secure the mounting arm 26 and to prevent axial movement thereof within the bores 74. The setscrews 88 exert a downward force on the mounting arm 26, which in turn exerts a downward force on the lever 94. Combining this downward force with the upward force exerted by the panel 38, in conjunction with the interaction between the fingers 78 and channels 62 and between the sloped ridges 80, 60, helps securely clamp the clamping member 24 onto the fender 22.

Figure 1:
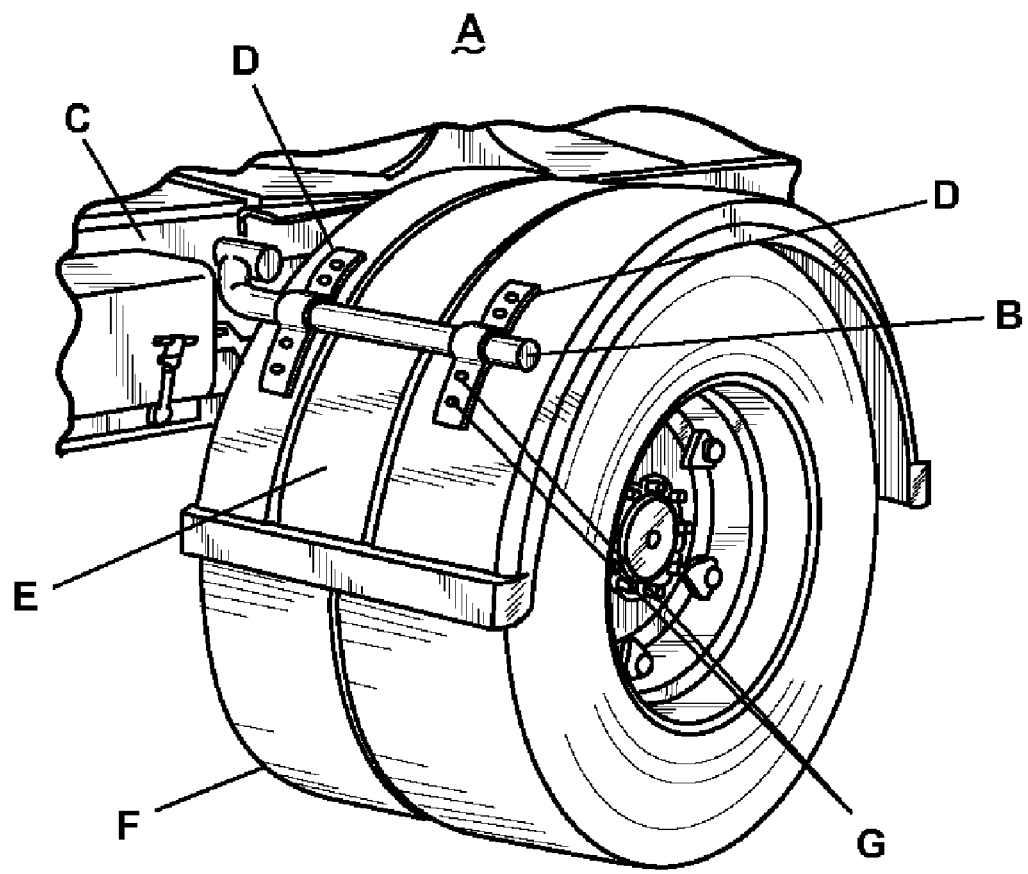
FIG. 1 is a perspective view of an exemplary prior art fender assembly.

If the fender assembly 20 is improperly mounted to the vehicle 10, e.g. if the fender 20 is too high or too low relative to the wheels 14, the fender assembly 20 can easily be partially disassembled to adjust the position thereof. The setscrews 88 are loosened, and the clamping members 24 and fender 22 are moved laterally relative to the mounting arm 26 for removal therefrom. Because the mounting arm 26 no longer clamps down on the lever 94, the clamping members 24 can easily be pulled from the mount sections 50 and repositioned along the length thereof in order to properly orient the fender 22. For example, if the fender 22 needs to be raised relative to the wheels 14, then the clamping members 24 are shifted to a lower position within the mount sections 50. Depending on the shape of the fender 22 and the number of mount sections 50/clamping members 24 utilized, the fender 22 can be adjusted to various degrees in several directions. In prior art fender assemblies, such as that shown in FIG. 1, adjustment of the fender E is limited to rotating the fender E about the point where the mounting arm B is attached to the vehicle frame C. In the inventive fender assembly 20, the clamping members 24 are simply pulled from the mount sections 50 and reinserted at a new desired location. Repositioning the clamping members 24 is a quick process that requires neither extensive labor nor physical alteration of the fender 22. After the clamping members 24 have been moved, then the fender 22 and attached clamping members 24 are mounted to the mounting arm 26 as described above.

The invention addresses the deficiencies of the prior art by providing a fender assembly comprising a fender and clamping members adapted to be removably coupled thereto to facilitate mounting the fender to a vehicle without permanently altering (e.g. drilling or welding) the fender. The fender and the clamping members include reciprocal mating elements in the form of fingers/channels and sloped ridges that interlock to securely retain the fender between the clamping members and easily separate for removing the clamping members from the fender. Consequently, the fender can be quickly mounted to the vehicle and, if necessary, easily adjusted in several directions thereafter. The fender assembly does not require drilling, welding, or other laborious installation processes, and the fender can be accurately mounted to the vehicle in a desired position, even when working within a limited space on and near the vehicle frame. Further, because the fender assembly is adjustable, it can be utilized on several types of vehicles and can be transferred from one vehicle to another if desired.

While the invention has been specifically described in connection with certain specific embodiments thereof, it is to be understood that this is by way of illustration and not of limitation. For example, one of the clamping members can be permanently mounted to the mounting arm and the other clamping member can be releasably mounted to the mounting arm. Further, whereas it is preferred that both clamping members are identical, they need not be identical. For example, only one of the clamping members and one edge of the fender can have the complementary serrations and the other clamping member and other edge of the fender can be without the complementary serrations. Reasonable variation and modification are possible within the forgoing disclosure and drawings without departing from the spirit of the invention that is defined in the appended claims.

What is claimed is:

1. A fender assembly comprising:
a vehicle fender;
a mounting arm adapted to be attached to a vehicle frame at one end and adapted to extend transversely at least partially across the fender to support the fender at the other end; and
a pair of clamping members that are mounted on the mounting arm, and the clamping members are adapted to mount the fender for selective adjustment of the fender with respect to the mounting arm and with respect to the frame of a vehicle when the one end of the mounting arm is attached to a vehicle frame, and the clamping members are further adapted to clamp portions of the fender between them when the clamping members are mounted to the mounting arm.

2. A fender assembly according to claim 1 wherein at least one of the clamping members is adapted to clamp against a side edge portion of the fender.

3. A fender assembly according to claim 1 wherein at least one of the clamping members is adapted to releasably mount to the mounting arm.

4. A fender assembly according to claim 1 wherein the clamping members are adapted to adjustably mount to the fender without physical alteration of the fender.

5. A fender assembly according to claim 1 wherein the fender has side edges and at least one of the clamping members has grooves that receive a side edge portion of the fender.

6. A fender assembly according to claim 1 wherein the fender is integrally molded of a synthetic plastic resin.

7. A fender assembly according to claim 1 wherein the at least one clamping member is integrally molded of a synthetic plastic resin.

8. The fender assembly according to claim 1 wherein the clamping members are respectively mounted to inboard and outboard portions of the mounting arm, and at least one of the clamping members is movable along the mounting arm.

9. The fender assembly according to claim 1 wherein the mounting arm is adapted to extend transversely at least partially across an upper side of the fender.

10. A fender assembly according to claim 3 wherein the fender has side edges and at least one of the clamping members has grooves that receive a side edge portion of the fender.

11. A fender assembly according to claim 10 wherein the fender side edge portion and the at least one clamping member include complementary mating elements that lock the clamping member and fender in an adjusted relationship.

12. A fender assembly according to claim 10 wherein the fender is integrally molded of a synthetic plastic resin.

13. A fender assembly according to claim 10 wherein the side edge portion of the fender side edge that is received in the groove forms an undercut pocket that receives a portion of the at least one clamping member.

14. A fender assembly according to claim 11 wherein the complementary mating elements are in the form of serrations on the fender side edge and on the groove in the at least one clamping member.

15. A fender assembly according to claim 14 wherein the serrations comprise channels and fingers.

16. A fender assembly according to claim 15 wherein the complementary mating elements further comprise complementary sloped ridges between the channels and fingers on the fender side edges and the groove in the clamping members.

17. A fender assembly according to claim 12 wherein the synthetic plastic resin is a high density polypropylene.

18. A fender assembly according to claim 17 wherein the at least one clamping member is integrally molded of a synthetic plastic resin.

19. A fender assembly according to claim 18 wherein the clamping members are integrally molded of a fiberglass-filled nylon.

20. A fender assembly according to claim 18 and further comprising a bore in at least one clamping member for receiving the mounting arm.

21. A fender assembly according to claim 20 and further comprising a threaded aperture in the at least one clamping member transverse to and intersecting the bore, and a set screw in threaded apertures for releasably retaining the relative positions of the at least one clamping member on the mounting arms.

22. A fender assembly according to claim 21 wherein the threaded bore is formed in a metal T nut mounted in a through hole in the at least one of the clamping members, wherein the T nut has a lateral flange that is received in the bore.

23. A fender assembly according to claim 7 wherein the clamping members are integrally molded of a fiberglass-filled nylon.

24. A fender assembly according to claim 7 and further comprising a bore in at least one clamping member for receiving the mounting arm.

25. A fender assembly according to claim 24 and further comprising a threaded aperture in the at least one clamping member transverse to and intersecting the bore, and a set screw in threaded apertures for releasably retaining the relative positions of the at least one clamping member on the mounting arms.

26. A fender assembly according to claim 25 wherein the threaded bore is formed in a metal T nut mounted in a through hole in the at least one of the clamping members, wherein the T nut has a lateral flange that is received in the bore.

27. The fender assembly according to claim 8 wherein the clamping member at the inboard portion of the mounting arm is movable along the mounting arm.

28. The fender assembly according to claim 27 wherein both of the clamping members are movable along the mounting arm.

29. A vehicle fender adapted to adjustably mount to a vehicle without alteration of the fender wherein at least one side edge portion of the fender has serrations that are adapted to mate with a clamping member that has complementary serrations and is supported by a support arm that is adapted to be mounted to a vehicle, characterized in that the serrations comprise channels and fingers.

30. A vehicle fender according to claim 29 and further comprising complementary sloped ridges between the channels and fingers.

31. A vehicle fender according to claim 29 wherein the fender is integrally molded of a synthetic plastic resin.

32. A vehicle fender according to claim 29 wherein the at least one side edge portion of the fender forms an undercut pocket that is adapted to receive a portion of the at least one clamping member.

33. A fender assembly comprising:
a vehicle fender;
a mounting arm adapted to be attached to a vehicle frame at one end and adapted to support the fender at the other end; and
a pair of clamping members that are mounted on the mounting arm, and the clamping members are adapted to mount the fender for selective adjustment of the fender with respect to the mounting arm and with respect to the frame of a vehicle when the one end of the mounting arm is attached to a vehicle frame, the clamping members further being adapted to clamp portions of the fender between them when the clamping members are mounted to the mounting arm;
wherein the fender and at least one of the clamping members includes complementary mating elements that lock the at least one clamping member and the fender in an adjusted relationship.

34. A fender assembly according to claim 33 wherein the complementary mating elements are in the form of serrations on the fender side edges and a groove in the at least one clamping member.

35. A clamping member for use in adjustably mounting a fender to a vehicle and comprising:
an attachment part for releasably attaching the clamping member to a mounting arm that is adapted to be attached to a vehicle; and
a groove that is adapted to receive a portion of a side edge of the fender to clamp the fender to the mounting arm and has a plurality of elements for locking the clamping member onto the side edge portion of the fender.

36. A clamping member according to claim 35 wherein the locking elements comprise a plurality of serrations for gripping the side edge portion of the fender.

37. A clamping member according to claim 36 wherein the serrations comprise channels and fingers.

38. A clamping member according to claim 37 and further comprising complementary sloped ridges between the channels and fingers on the groove.

39. A clamping member according to claim 38 wherein the clamping member is integrally molded of a synthetic plastic resin.

* * * * *